(12) United States Patent
Chougala et al.

(10) Patent No.: US 10,114,706 B1
(45) Date of Patent: Oct. 30, 2018

(54) BACKUP AND RECOVERY OF RAW DISKS [RDM] IN VIRTUAL ENVIRONMENT USING SNAPSHOT TECHNOLOGY

(71) Applicant: EMC Corporation, Hopkinton, MA (US)

(72) Inventors: Shivanand Chougala, Bangalore (IN); Yogesh Suresh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 14/861,080

(22) Filed: Sep. 22, 2015

(51) Int. Cl.
| | |
|---|---|
| *G06F 11/14* | (2006.01) |
| *G06F 3/06* | (2006.01) |
| *G06F 9/50* | (2006.01) |
| *G06F 9/455* | (2018.01) |

(52) U.S. Cl.
CPC ........ *G06F 11/1469* (2013.01); *G06F 3/0619* (2013.01); *G06F 3/0665* (2013.01); *G06F 3/0689* (2013.01); *G06F 9/45558* (2013.01); *G06F 9/5027* (2013.01); *G06F 11/1451* (2013.01); *G06F 11/1464* (2013.01); *G06F 2009/4557* (2013.01); *G06F 2201/84* (2013.01)

(58) Field of Classification Search
CPC ............. G06F 11/1451; G06F 2201/84; G06F 2201/815; G06F 17/30233; G06F 11/1469; G06F 9/5077; G06F 11/1484
See application file for complete search history.

(56) References Cited

U.S. PATENT DOCUMENTS

| | | | | |
|---|---|---|---|---|
| 2009/0313447 A1* | 12/2009 | Nguyen | ............. | G06F 11/1451 711/162 |
| 2013/0246725 A1* | 9/2013 | Kawamoto | ............. | G06F 3/065 711/162 |
| 2015/0212845 A1* | 7/2015 | Tsirkin | ................ | G06F 9/45558 711/114 |
| 2017/0097776 A1* | 4/2017 | Vasilyev | ............. | G06F 11/1451 |

* cited by examiner

*Primary Examiner* — Reginald G Bragdon
*Assistant Examiner* — Thanh D Vo
(74) *Attorney, Agent, or Firm* — Womble Bond Dickinson (US) LLP

(57) ABSTRACT

Systems and methods are disclosed for performing a backup or restoring one or more virtual disks of a virtual machine (VM) having a universally unique identifier (UUID). A backup API within a virtual machine manager (VMM) on a host can discover virtual disks that are configured for a particular VM. The VMM can use the backup API to communicate with a backup agent on a source storage to discover mappings of virtual disks to portions of storage, including mapping of raw virtual disks to logical units of storage on a storage device or appliance. Backup of the virtual disks can include backing up the VM configuration data and metadata and backing up the raw disk mapping files. Backups can be in accordance with one or more policies stored at the backup server and associated with the virtual machine UUID or associated with an account that the virtual machine, or its user, are associated with.

15 Claims, 13 Drawing Sheets

US 10,114,706 B1

BACKUP AND RECOVERY OF RAW DISKS [RDM] IN VIRTUAL ENVIRONMENT USING SNAPSHOT TECHNOLOGY

TECHNICAL FIELD

This disclosure relates to the field of backing up data from a virtual machine to a backup server.

BACKGROUND

A virtual machine in a virtual computing infrastructure can run on a host device that comprises physical hardware and virtualization software. One or more applications that can run within the virtual machine can generate data that may be stored on one or more virtual disks. Virtual disks can be raw devices. A raw device is a type of block device file that allows accessing a storage device such as a hard disk directly, bypassing operating system caches and buffers. An application can use a raw device directly, enabling the application to manage how data is cached, rather than deferring cache management to the operating system. A raw device can be mapped to one or more portions of storage. A portion of storage can include a logical unit of storage ("LUN"). A portion of storage may be a part of one or more storage appliances. Thus, a virtual disk may span multiple physical storages. A raw disk mapping file enables a virtual machine to view a virtual disk as though it is a single physical disk. A raw disk mapping file maps a virtual disk to portions of storage that make up the raw device. Typically, the raw disk mapping file resides on the storage device that provides the portions of storage that make up the raw disk. The raw disk mapping file for a virtual disk is typically not visible to the virtual machine for which the virtual disk is configured. Raw disk mapping can be either physical mapping or virtual mapping. In virtual mapping, the disk is presented as it if is a logical volume, or a virtual disk file, to a guest operating system and real hardware characteristics of a storage device are hidden. In physical mapping, the Virtual Machine Manager bypasses input/output (I/O) virtualization software and passes I/O commands directly to the physical storage device.

A remote backup server can be used to backup one or more virtual disks of a virtual machine. However, the backup server does not have visibility into the virtual machine to determine the identification of the virtual disks configured for a particular virtual machine. Further, the backup server does not have visibility into the relationship between the virtual machine, the virtual disk(s) configured for the virtual machine, and the raw disk device maps for the virtual disk(s) that would let the backup server backup a virtual disk that comprises a raw device for the virtual machine.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
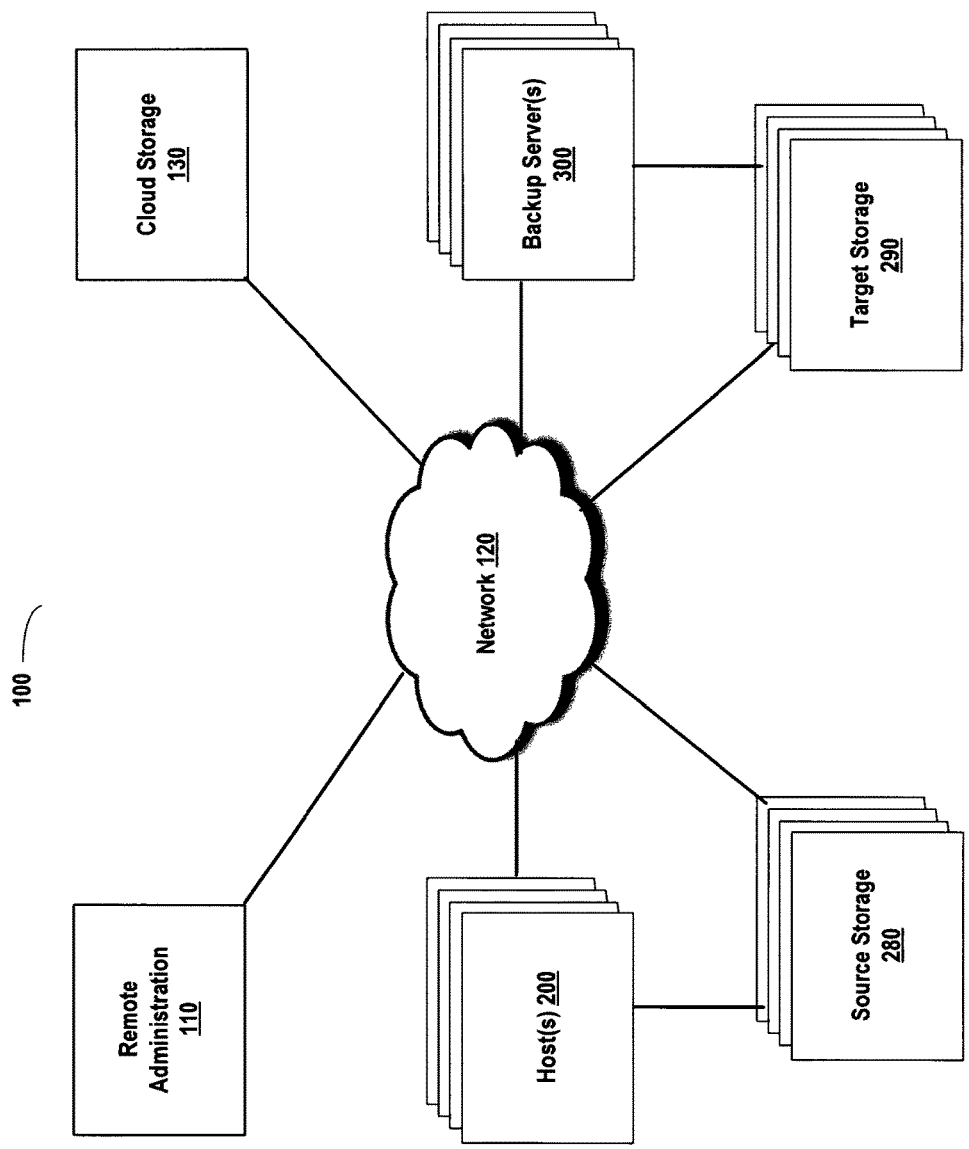
FIG. 1 illustrates, in block diagram form, an overview of a virtual infrastructure for backing up and restoring one or more virtual disks of a virtual machine in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for backing up and restoring one or more virtual disks of a virtual machine. The virtual disk(s) can be raw disks, with either physical or virtual mapping to portions of storage, such as logical units of storage (LUNs). In an embodiment, a backup application on a backup server can request that a virtual machine prepare for backup of one or more virtual disks of the virtual machine (VM). In an embodiment, a backup API on the virtual machine manager (VMM) can be used to obtain the properties about the file system of the VM, such as the filename, file sizes, and file types, of the virtual disks configured for the virtual machine. The backup API on the VMM can also be used to call a backup agent on a source storage that contains a raw device map for raw virtual disks configured for the VM. The backup agent can request that the backup server provide an updated version of the backup agent, to the backup agent, so that the backup agent can update itself before performing a backup or restore of the virtual disks for the VM. The backup agent can send the file properties obtained from the backup API by the VMM, and the raw device maps, and other virtual file metadata, to the backup server so that the backup server can prepare a target storage to receive portions of storage (e.g. LUNs) corresponding to the virtual disks, from the source storage, to backup the virtual disks. The VMM can monitor the progress of the backup of the virtual disks from the source storage view. The backup server can monitor the progress of the backup of the virtual disks from the target storage view. Backup agent on the source storage can facilitate transfer of the virtual disk data from the source storage to the target storage.

In an embodiment, a VMM can request that the backup server restore one or more virtual disks to the VM. The backup server can lookup, in a catalog on the backup server, the virtual disks and file system properties and metadata associated with the virtual machine (VM). The backup server can send the file system properties and metadata to the VMM. The VMM can call a backup API within the VMM to restore configuration information for the file system and virtual disks for the VM. The VMM can also use the backup API to call a backup agent in the source storage to notify the source storage to prepare for restoration of one or more virtual disks of the VM. A backup agent on the source storage can request an update to the backup agent, from the backup server, so that the backup agent can update itself before restoring the virtual disks to the source storage. The backup agent can receive an updated backup agent and update itself before the restoration of the virtual disks for the VM begins. The backup agent can cause the source storage to recreate raw disk device maps for the one or more virtual disks, and allocate storage on the source storage device for the one or more virtual disks. The source storage can then request data from the target storage, optionally facilitated by the backup server, to be sent to the source storage, optionally facilitated by the backup agent.

The backup or restore of the file system and/or virtual disks of a virtual machine can be initiated by a user of the virtual machine, by an administrator using a remote administration module, or automatically by the backup server in accordance with a policy. In another embodiment, a method of a backup server backing up a virtual machine one or more virtual disks can include the backup server receiving a virtual machine identifier, such as a virtual machine UUID, from a virtual machine. The backup server can use the UUID of the virtual machine to look up an account on the backup server, the account being associated with the virtual machine UUID. The backup server can transmit an update of a backup application on the virtual machine. The backup server can also transmit a full version of a backup application to the virtual machine for installation of the backup application on the virtual machine. The backup server can register the virtual machine and virtual machine UUID in response to a request form the virtual machine to register the virtual machine and UUID with the backup server.

The method can further include the backup server receiving a list of virtual disks to backup from the virtual machine that are on the virtual machine. The method also can include the backup server looking up a backup policy for an account associated with the virtual machine and UUID. The backup server can receive backup data for one or more virtual disks from the virtual machine backup application. In an embodiment, the backup server can receive confirmation from the virtual machine that the backup has completed.

Any of the above methods can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of a virtual infrastructure 100 for backing up or restoring one or more virtual disks of a virtual machine accordance with some embodiments.

A virtual infrastructure 100 can include one or more host devices 200 (or "client devices") and one or more storage appliances 280 and 290 coupled to a network 120 and a backup server 300 coupled to the network 120. A remote administration module 110 can also be coupled to one or more hosts 200, the storage appliance(s) 280, and the backup server 300 via network 120. Hosts 200, storage appliance(s) 280 and 290, backup server 300, and remote administration module 110 can also be coupled to a one or more cloud storage services 130. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as storage system 300. Network 120 may be any type of networks such as a local area network (LAN), a wide area network (WAN) such as the Internet, a fiber network, a storage network, or a combination thereof, wired or wireless.

A host 200 can backup or restore one or more virtual disks of a virtual machine on the host 200 to or from the backup server 300. Backup server 300 can, in turn, opt to store all or a portion of the backup data of the one or more applications to cloud storage 130. The virtual disks can map to one or more physical disk drives. The one or more physical disk drives can be located within host 200. In an embodiment, a virtual disk can map to a network attached storage (NAS) across network 120 such as storage appliance(s) 280. A storage appliance 280 can comprise a large number of disks, such as EMC® VMAX 400K with up to 5,760 hard drives. In an embodiment, one or more storage appliances 280 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a storage appliance 280. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a virtual disk on a virtual machine on host 200 can be initiated by a user of the virtual machine on host 200. In an embodiment, a remote administrator 110 can initiate a backup or restore of a virtual disk of a virtual machine on host 200. In an embodiment, backup server 300 can initiate a backup or restore of a virtual disk of a virtual machine on host 200. Backup server 300 can initiate a backup or restore of virtual disk on a virtual machine on host 200 in accordance with one or more backup policies associated with host 200 or with a virtual machine on host 200. In an embodiment, a backup policy can be application-specific. For example, a policy for a virtual machine on host 200 can be that a full backup of a virtual disk is performed every Friday evening.

Figure 2:
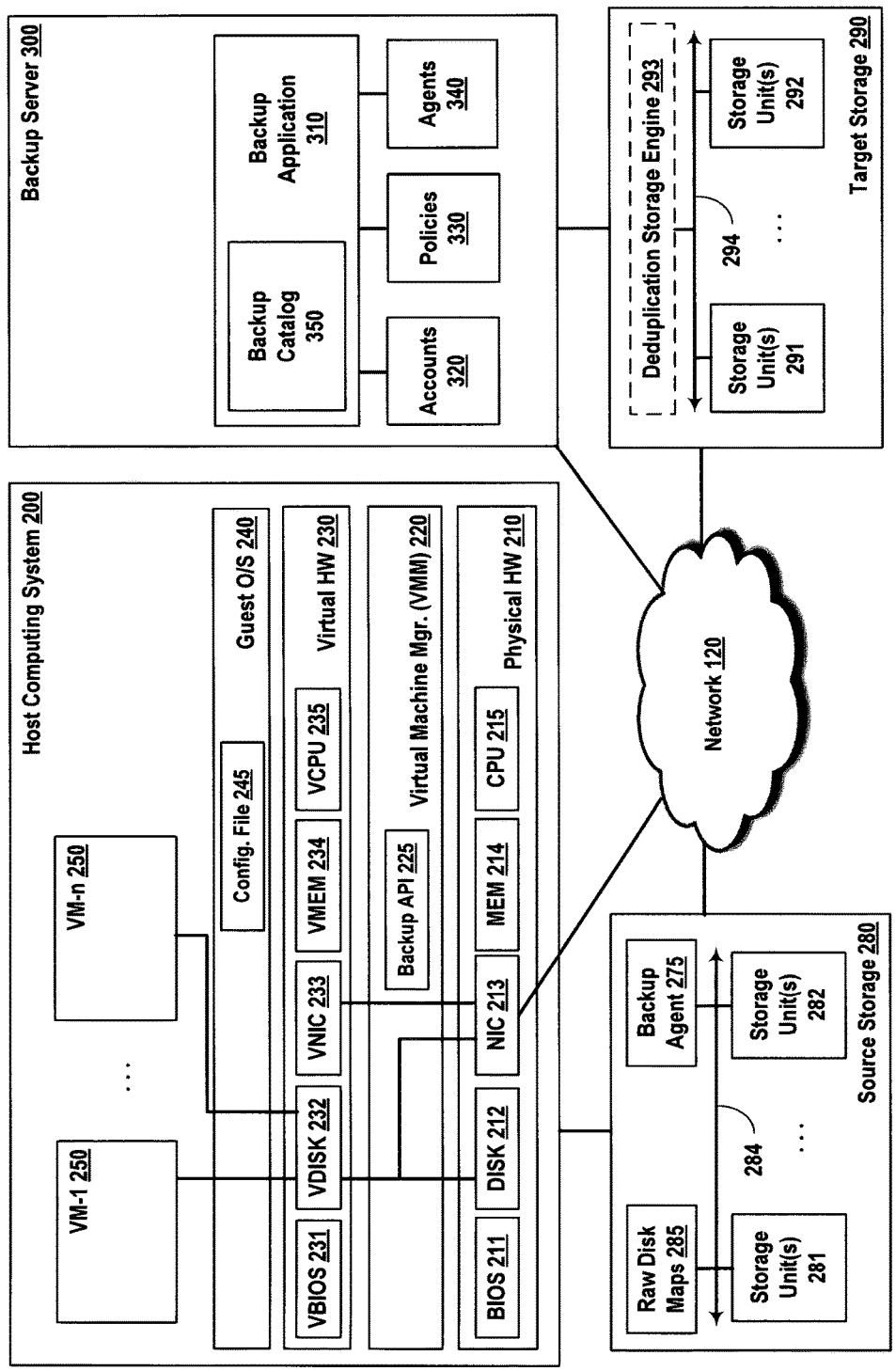
FIG. 2 illustrates, in block diagram form, a detailed view of a virtual infrastructure for backup up and restoring one or more virtual disks to be backed up, in accordance with some embodiments.

FIG. 2 illustrates, in block diagram form, a detailed view of a virtual infrastructure 100 for backing up or restoring one or more virtual disks of a virtual machine 250 accordance with some embodiments.

A virtual infrastructure 100 can include one or more host computing systems 200 ("client device"), a backup server 300, a source storage 280, and a target storage 290. In an embodiment, these components can be communicatively interconnected via network 120.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless.

Client device 200 can include physical hardware 210, a virtual machine manager (VMM) 220, virtual hardware 230, a guest operating system 240, and one or more virtual machines 250.

Physical hardware 210 can include a physical basic input-output system (BIOS) 211, one or more physical disks or storage devices 212, one or more network interface cards (NIC) 213, memory 214, and one or more processors or CPUs 215. Client device 200 can be implemented in accordance with the computing system described with reference to FIG. 13, below.

Client device 200 can include virtualization machine manager (VMM) 220 that provides a virtualization abstraction layer to support one or more virtual machines (VMs) 250 on client device 200. VMM 220 can include a backup application programming interface (API) 225 that can access information within VMs 250 and within client device 200 that may be needed to perform a backup or restore of a virtual machine 250, of data generated by a virtual machine 250, or of one or more virtual disks 232. In an embodiment, backup API 225 can communicate with backup application 310 via network 120. Backup API 225 can be used to perform an image backup or restore of an entire virtual machine 250. In an embodiment, backup API 225 can communicate with a backup agent 275 within a source storage 280. Backup API 225 can communicate with a VM 250, guest OS 240, virtual hardware 230, or physical hardware 210 via interprocess communication, such as messaging, shared memory, sockets, or other communication methods.

Client device 200 can further include virtual hardware 230 that can correspond to physical hardware 210, such as a virtual BIOS 231, one or more virtual storage devices (VDISK) 232, one or more virtual network interface cards (VNIC) 233, virtual memory 234, and one or more virtual processors 235.

In an embodiment, a virtual BIOS 231 identifier within the virtual hardware 230 can provide a portion of a globally unique identifier (UUID) for virtual machine 250 for purposes of performing backup functionality described herein. In an embodiment, a virtual machine 250 UUID can be persistent with a particular virtual machine 250, even if the virtual machine 250 is moved ("migrated") to a different client device 200.

Client device 200 can also include one or more guest operating systems (OS) 240. Configuration file 245 can reside within guest OS 240. Configuration file 245 can store information that can be used by VMM 220 to implement each virtual machine 250, such as a list of the virtual disks 232 that are accessible by a particular virtual machine 250. Configuration file 245 can further include filenames and file properties of one or more files in a virtual file system for a virtual machine 250. Configuration file 245 can further include a name of a raw disk mapping file that maps a virtual disk 232 to a raw disk on source storage 280.

In an embodiment, client device 200 can further include a storage manager or storage controller (not shown) configured to manage storage resources of host 200, such as, for example, storage space and processing resources (e.g., processor, memory, network resources). The storage manager or controller may be accessed by an administrator of management console or server 110 (as shown in FIG. 1) remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Source storage 280 can include any type of server or cluster of servers. For example, source storage 280 may be a storage server used for any of various different purposes, such as to provide multiple users with access to shared data and/or to back up mission critical data. Source storage 280 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Source storage 280 may have a distributed architecture, or all of its components may be integrated into a single unit. Source storage 280 may be implemented as part of a source storage available from EMC® Corporation of Hopkinton, Mass., such as the EMC® VMAX family of storage appliances.

Source storage 280 can contain backup logic, or "backup agent" 275 that manages both backup and restore processes within the source storage 280. Backup agent 275 can communicate with backup API 225 in VMM 220 of host computing system 200. Backup agent 275 can further communicate with backup application 310 on backup server 300 to perform operations that implement backup of data from source storage 280 to target storage 290, or operations to restore data from target storage 290 to source storage 280. Source storage 280 can also contain VM disk files that are the content files of the VMs. Source storage can include, e.g. storage unit(s) 281-282. Storage units 281-282 may be implemented locally (e.g., single node operating environment) or remotely (e.g., multi-node operating environment) via interconnect 284, which may be a bus and/or a network. In one embodiment, one of the storage units 281-282 can operate as an active storage to receive and store external or fresh user data, while the other storage unit operates as a target storage unit to periodically archive data from the active storage unit according to an archiving policy or scheme. Storage units 281-282 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 281-282 may also be combinations of such devices. In the case of disk storage media, the storage units 281-282 may be organized into one or more volumes of Redundant Array of Inexpensive Disks (RAID). Note that a source storage of a client may also be called the primary storage of the client to distinguish the storage from backup source storages.

Source storage 280 can further includes raw disk mapping files 285 that map a virtual disk 232 of a virtual machine to one or more portions of storage on the source storage 280. A portion of a source storage 280 can be a logical unit number (LUN). Raw disk mapping to one or more portions of storage can be physical mapping or a virtual mapping. Source storage 280 can be coupled to backup server 300 and/or target storage 290 via network 120.

Target storage 290 can be coupled to backup server 300 either as direct attached storage (DAS) or as network attached storage (NAS) via network 120. Target storage 290 may include any type of server or cluster of servers. For example, target storage 290 may be a storage server used for any of various different purposes, such as to provide multiple users with access to shared data and/or to back up mission critical data. Target storage 290 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Target storage 290 may have a distributed architecture, or all of its components may be integrated into a single unit. Target storage 290 may be implemented as part of an archive and/or backup storage system such as a de-duplication storage system available from EMC® Corporation of Hopkinton, Mass.

Target storage 290 can include, but is not limited to, deduplication storage engine 293, and one or more storage units 291-292 communicatively coupled to each other. Storage units 291-292 may be implemented locally (e.g., single node operating environment) or remotely (e.g., multi-node operating environment) via interconnect 294, which may be a bus and/or a network. In one embodiment, one of the storage units 291-292 operates as an active storage to receive and store external or fresh user data, while the other storage unit operates as a target storage unit to periodically archive data from the active storage unit according to an archiving policy or scheme. Storage units 291-292 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 291-292 may also be combinations of such devices. In the case of disk storage media, the storage units 291-292 may be organized into one or more volumes of Redundant Array of Inexpensive Disks (RAID). Note that in one embodiment, backup server 300 and target storage 290 are integrated into one single system.

In response to a data file to be stored in storage units 291-292, optional deduplication storage engine 293 is configured to segment the data file into multiple segments according to a variety of segmentation policies or rules. Deduplication storage engine 293 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 291-292 or across at least some of storage units 291-292. Data stored in the storage units 291-292 may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup server 300 can be a computing system as described with reference to FIG. 13, below. Backup server 300 can comprise one or more computing systems. Backup server 300 includes, but is not limited to, a backup application 310 which can contain a backup catalog 350. Backup catalog 350 can contain information about the files that are backed up, such as file attributes, file name, access control information, and information about layout of the files or blocks within a disk snapshot. Metadata files also backed up can include a raw disk mapping file 285 that maps a virtual disk to one or more portions of storage, e.g. LUNs of a source storage.

Backup server 300 can coordinate with source storage 280, target storage 290, and host computing system 200 to run various backup operations. Backup application 310 may perform both backup and restore functions. Backup application 310 can communicate with backup API 225 within VMM 220 of a host 200 having a virtual machine 250 to be backed up. Backup application 310 can also communicate with backup agent 275 in source storage 280 to run various operations. Backup application 310 can read and write backup accounts 320, backup policies 330, and backup agents 340. Accounts 320, policies 330, and agents 340 can reside on a single storage device accessible to backup server 300, or across multiple storage devices accessible to backup server 300.

Backup accounts 320 can include login information to backup server 300 for users of virtual machines 250 and administrators who may access backup server 300 via remote administration module 110. Accounts 320 can be aggregated by company, by region, or other metric, such that backup policies 330 can be generated for one or more backup accounts 320 by company, by region, or other metric, such as by data center or business operating group.

Backup policies 330 can specify particular applications or virtual disks whose data gets backed up from one or more virtual machines 250, retention policy for the backed up data, whether the backups are incremental, full, image, or an alternating or interleaved combination of these. Backup policies 330 can further define whether data is deduplicated before storage, how quickly the storage can be retrieved for access by a virtual machine, and other policy parameters.

Backup agents 340 can include modules that can perform general backup and restore functions and can additionally include modules that can perform specific functionality such as backing up or restoring a raw virtual disk or backing up data for a particular application. A VMM 220 can request an updated version of its own backup API 225. A backup agent 275 of a source storage 280 can request an updated version of itself before performing a backup or restore operation.

Backup catalogs 350 can be generated at backup or restore time to indicate the data that was backed up from, or restored to, a particular virtual machine 250. In addition, backup catalogs 350 can be updated if a status, location, or other relevant fact about a backup changes. For example, a policy 330 for a particular account may indicate that backups of all virtual machines for the account are to be retained for 30 days and, after the next backup, previous backups are to be moved to a lower tier storage such as tape. A policy may further indicate that after backups are 120 days old that the backups are to be erased. The backup catalogs 350 indicating the status of historic backups can be retained for an extended period of time. A policy 330 can determine how long backup catalogs 350 are retained.

Backup server 300 operating as a storage system may include or represent any type of servers or a cluster of one or more servers (e.g., cloud servers). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Figure 3:
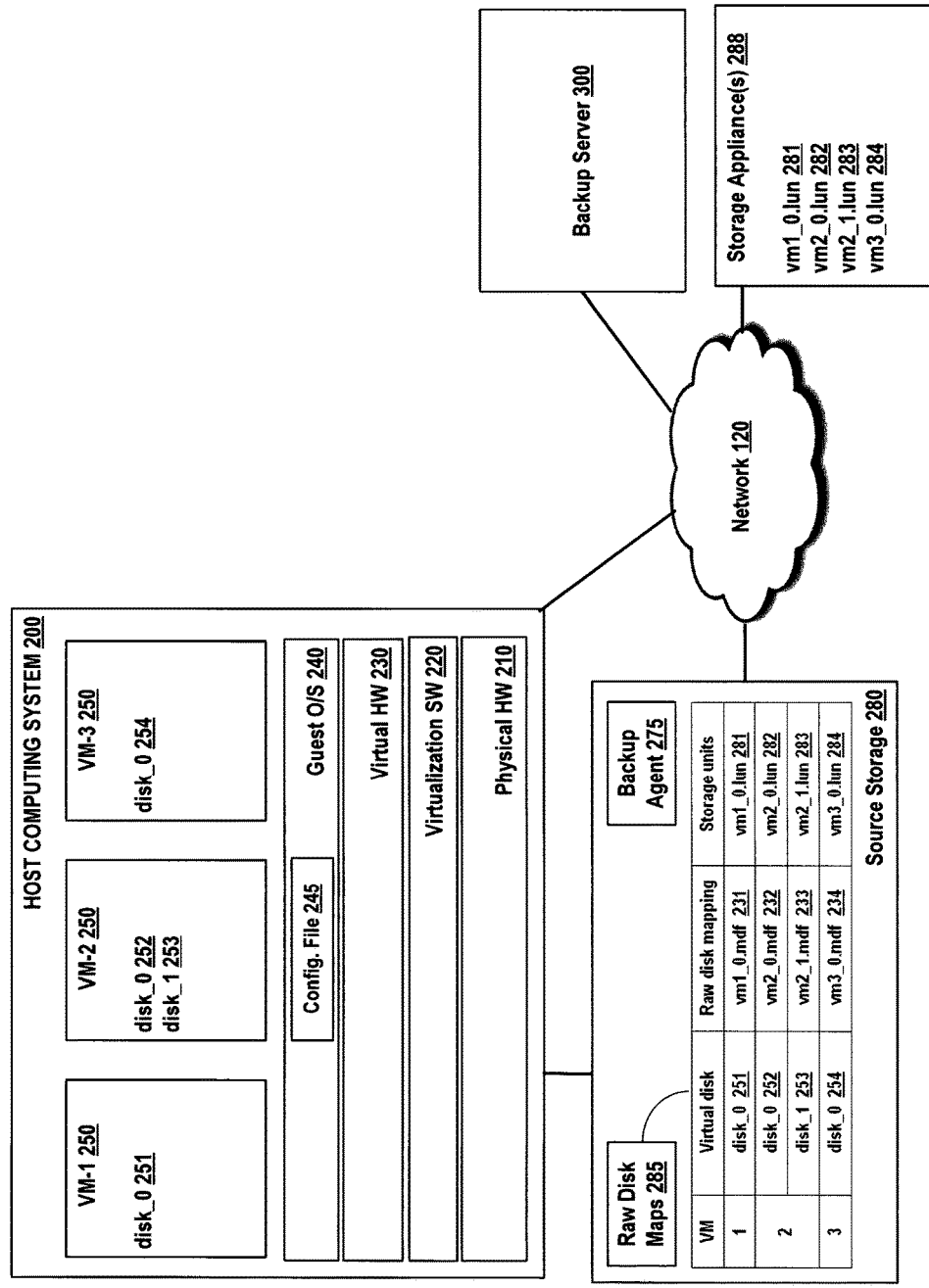
FIG. 3 illustrates a mapping of virtual disks to storage in a virtual infrastructure, according to some embodiments.

FIG. 3 illustrates a mapping of virtual disks to storage in a virtual infrastructure, according to some embodiments. In an example, a first virtual machine VM-1 (250) can have a virtual disk disk_0 (251). A second virtual machine VM-2 (250) on host 200 can have two virtual disks disk_0 (252) and disk_1 (253). A third virtual machine VM-3 (250) can have a virtual disk disk_0 (254). Configuration file 245 can indicate a mapping between virtual disks 251-254 and raw disk map metadata files 231-234 stored on source storage 280. Raw disk maps 231-234 can storage a mapping to storage units, or portions of storage, such as logical unit numbers (LUNs). A storage unit file, e.g. vm1_0.lun (281) can contain a mapping to one or more physical storages corresponding to the LUN. Physical storages can comprise a storage such as storage appliance(s) 280.

Figure 4:
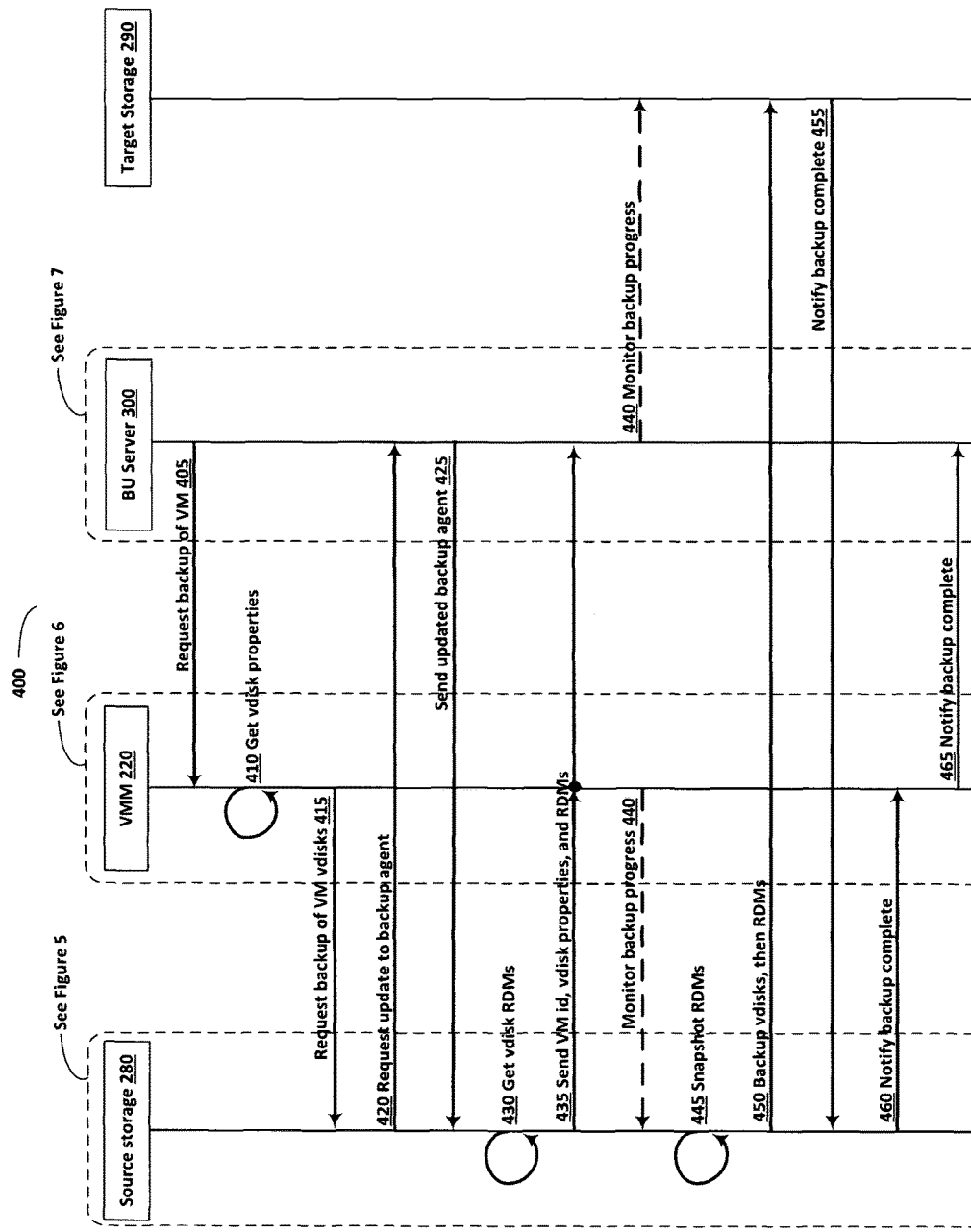
FIG. 4 illustrates an example communication flow for backing up one or more virtual disks of a virtual machine according to some embodiments.

FIG. 4 illustrates a communication exchange 400 during backing up of one or more virtual disks of a VM 250 in accordance with some embodiments. As can be seen from operations 405, the backup server can initiate a backup request for a particular VM 250 having a unique VM identifier (VM_ID). In response to the request 405, host 200 work together with source storage 280 to backup raw disk maps and virtual disks for the particular VM 250. Backup API 225 in VMM 220 can communicate with backup agent 275 in source storage 280 to execute operations to implement a backup or restore operation. See FIG. 5 for a method of backing up one or more disks of a VM 250 from the perspective of the backup agent 275 in the source storage 280. See FIG. 6 for a method of backing up one or more disks of a VM 250 from the perspective of the VMM 250 in host 200. See FIG. 7 for a method of backing up one or more disks of a VM 250, from the perspective of the backup server 300.

In operation 405, backup server 300 can request that host 200 perform a backup of one or more virtual disks of a VM 250. In an embodiment, the request can include a globally unique identifier (VM_ID) of the VM 250 whose virtual disks are to be backed up. The request can further specify details as to the scope of the data to be backed up (e.g. which application data should be backed up), the nature of the backup (incremental v. full v. image backup), and the target storage 290 to receive the data to be backed up. In an embodiment, the VM_ID for the VM 250 can be based, at least in part, on an identifier of the virtual BIOS 231 of the VM 250 whose data is being backed up.

In operation 410, in response to host 200 receiving the request 405 from backup server 300, host 200 can cause VMM 220 to use backup API 225 to read configuration file 245 to determine the virtual disk(s) 232 associated with VM 250 having identifier VM_ID to be backed up. Configuration file 245 may further contain information such as filenames, files types, creation dates, file sizes and other information related to data stored on the virtual disk(s) 232 associated with VM 250 that may be useful in performing the backup.

In operation 415, VMM 220 can request that backup agent 275 on source storage 280 perform a backup of one or more virtual disks 232 associated with VM 250 having VM_ID. The request to backup agent 275 can include the VM_ID of the VM 250 and a list of one or more virtual disks 232 associated with VM 250. The request to backup agent 275 can also include the target storage 290 to receive the backup data from source storage 280. The request can also include an address and/or name of the backup server 300 from which the backup request originated.

In operation 420, backup agent 275 on source storage 280 can optionally request an updated backup agent 275 from storage server 300. The update request can include an address and/or name of the source storage 280 making the request, version information about the backup agent 275 currently installed on source storage 280, and optionally information about VM 250, such as the VM_ID, guest OS 240 of the VM 250, file types to be backed up, application(s) that generated the data to be backed up, etc.

In operation 425, backup server 300 can check its database of agents 340 to determine whether a newer version exists for the backup agent 275 on source storage 280. If so, then backup server 300 can send the updated backup agent to the existing backup agent 275 on source storage 280 to update itself. If no new update exists for the backup agent 275, then backup server 300 can return a message stating that no new version of backup agent 275 is available.

In operation 430, backup agent 275 can use the list of one or more virtual disk(s) 232 associated with the VM 250, obtained in operation 415, to determine a file name of a raw disk mapping file 285 for each virtual disk 232 to be backed up. Backup agent 275 can also determine a raw disk mapping type (physical or virtual) for each raw disk mapped for a virtual disk. In an embodiment, backup agent 275 can further determine the particular portions of storage (e.g. logical unit number, LUNs) that make up a raw disk.

In operation 435, backup agent 275 can transmit the VM_ID, name of the virtual disk(s) (as known to the VM 250), the filename of the mapping file 285 for each virtual disk mapped to a raw disk, the mapping type (physical or virtual), and an address of the source storage 280 and target storage 290 for the backup that is about to be performed by the backup agent 275. This information can be transmitted to the VMM 220 that requested the backup, the server 300 that originally requested the backup, or both. In an embodiment, the same information can be transmitted to target storage 290 as a manifest of the data to be backed up. The manifest can further include such metadata as the file size of each virtual disk or file so that the target storage 290 can determine whether there is space to receive the data to be backed up.

In operation 440, one or both of VMM 220 or backup server 300 can optionally monitor the progress of the backup that is about to begin. Monitoring can include polling the backup agent 275 to determine backup progress or subscribing to messages from backup agent 275 regarding the backup. In an embodiment, backup server 300 can monitor target storage 290 as to progress of the backup, while VMM 250 monitors source storage 280 progress of the backup.

In operation 445, backup agent 275 can cause source storage 280 to take a snapshot of the data to be backed up. In the case of raw disks, the raw disk mapping file 285 for each virtual disk to 232 be backed up can be used to determined the logical units of storage that should be snapshot.

In operation 450, the backup begins. In an embodiment, first the virtual disks 232 can be backed up, then the raw disk mappings can be transmitted. Backup agent 275 on source storage 280 can facilitate the transfer of data from source storage 280 to target storage 290. In an embodiment, a backup agent (not shown) in target storage 290 can be used to request specific items of data from the source storage 280 to be backed up to the target storage 290. The backup agent (not shown) can use the VM_ID, virtual disk properties, and raw disk mappings 285 to facilitate the backup. If such a backup agent (not shown) is used by the target storage 290, backup server 300 can pass the VM_ID, virtual disk properties, and raw disk mappings to the backup agent (not shown) to use in determining the data to be requested, received, and stored for backup.

In operation 455, target storage 290 can notify source storage 280 (and backup agent 275) that all data to be backed up has been received and stored.

In operation 460, source storage 280 can notify VMM 220 that the backup is complete.

In operation 465, VMM 220 can notify backup server 300 that the backup is complete.

Figure 5:
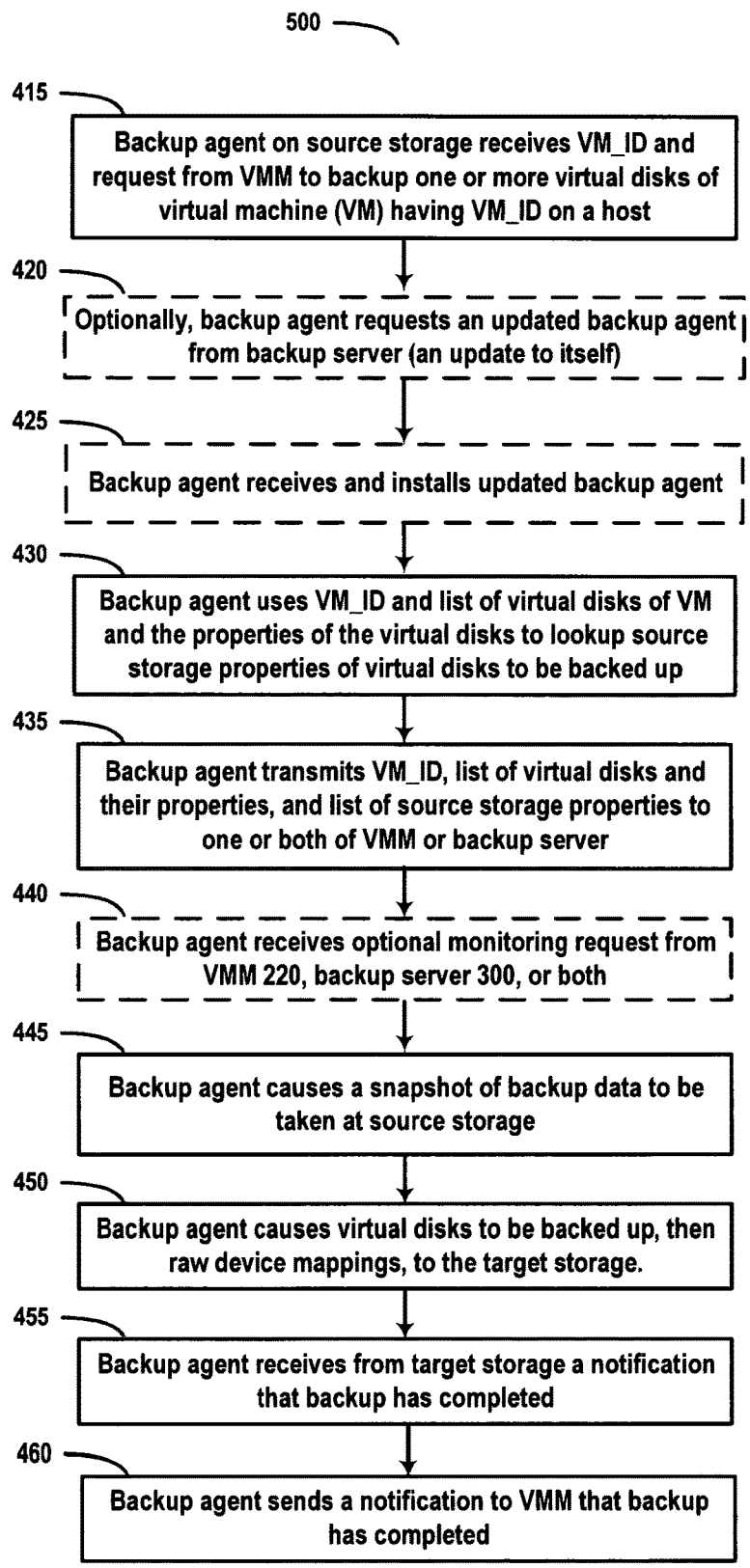
FIG. 5 illustrates a flow chart of a method of a source storage backup agent backing up one or more virtual disks of a virtual machine according to some embodiments.

FIG. 5 illustrates a method 500 of backing up one or more disks of a VM 260, from the perspective of the source storage 280 and backup agent 275 on source storage 280.

In operation 415, backup agent 275 on source storage 280 can receive a request from a VMM 220 to perform a backup of one or more virtual disks 232 associated with VM 250 having VM_ID. The request to backup agent 275 can include the VM_ID of the VM 250 and a list of one or more virtual disks 232 associated with VM 250. The request to backup agent 275 can also include the target storage 290 to receive the backup data from source storage 280. The request can also include an address and/or name of the backup server 300 from which the backup request originated.

In operation 420, backup agent 275 on source storage 280 can optionally request an updated backup agent 275 from storage server 300. The update request can include an address and/or name of the source storage 280 making the request, version information about the backup agent 275 currently installed on source storage 280, and optionally information about VM 250, such as the VM_ID, guest OS 240 of the VM 250, file types to be backed up, application(s) that generated the data to be backed up, etc.

In operation 425, backup agent 275 can optionally receive an updated backup agent to the existing backup agent 275 on source storage 280 to update itself. If no new update exists for the backup agent 275, then backup agent 275 can receive a message from backup server 300 stating that no new version of backup agent 275 is available.

In operation 430, backup agent 275 can use the list of one or more virtual disk(s) 232 associated with the VM 250, obtained in operation 415, to determine a file name of a raw disk mapping file 285 for each virtual disk 232 to be backed up. Backup agent 275 can also determine a raw disk mapping type (physical or virtual) for each raw disk mapped for a virtual disk. In an embodiment, backup agent 275 can further determine the particular portions of storage (e.g. logical unit number, LUNs) that make up a raw disk.

In operation 435, backup agent 275 can transmit the VM_ID, name of the virtual disk(s) (as known to the VM 250), the filename of the mapping file 285 for each virtual disk mapped to a raw disk, the mapping type (physical or virtual), and an address of the source storage 280 and target storage 290 for the backup that is about to be performed by the backup agent 275. This information can be transmitted to the VMM 220 that requested the backup, the server 300 that originally requested the backup, or both. In an embodiment, the same information can be transmitted to target storage 290 as a manifest of the data to be backed up. The manifest can further include such metadata as the file size of each virtual disk or file so that the target storage 290 can determine whether there is space to receive the data to be backed up.

In operation 440, backup agent 275 may can optionally receive a backup progress monitor request from one or both of VMM 220 or backup server 300. Monitoring can include polling the backup agent 275 to determine backup progress or subscribing to messages from backup agent 275 regarding the backup.

In operation 445, backup agent 275 can cause source storage 280 to take a snapshot of the data to be backed up. In the case of raw disks, the raw disk mapping file 285 for each virtual disk to 232 be backed up can be used to determine the logical units of storage that should be snapshot.

In operation 450, the backup begins. In an embodiment, first the virtual disks 232 can be backed up, then the raw disk mappings can be transmitted. Backup agent 275 on source storage 280 can facilitate the transfer of data from source storage 280 to target storage 290. In an embodiment, a backup agent (not shown) in target storage 290 can be used to request specific items of data from the source storage 280 to be backed up to the target storage 290. The backup agent (not shown) can use the VM_ID, virtual disk properties, and raw disk mappings 285 to facilitate the backup. If such a backup agent (not shown) is used by the target storage 290, backup server 300 can pass the VM_ID, virtual disk properties, and raw disk mappings to the backup agent (not shown) to use in determining the data to be requested, received, and stored for backup.

In operation 455, source storage 280 can receive a message from target storage 290 that all data to be backed up has been received and stored.

In operation 460, source storage 280 can notify VMM 220 that the backup is complete.

Figure 6:
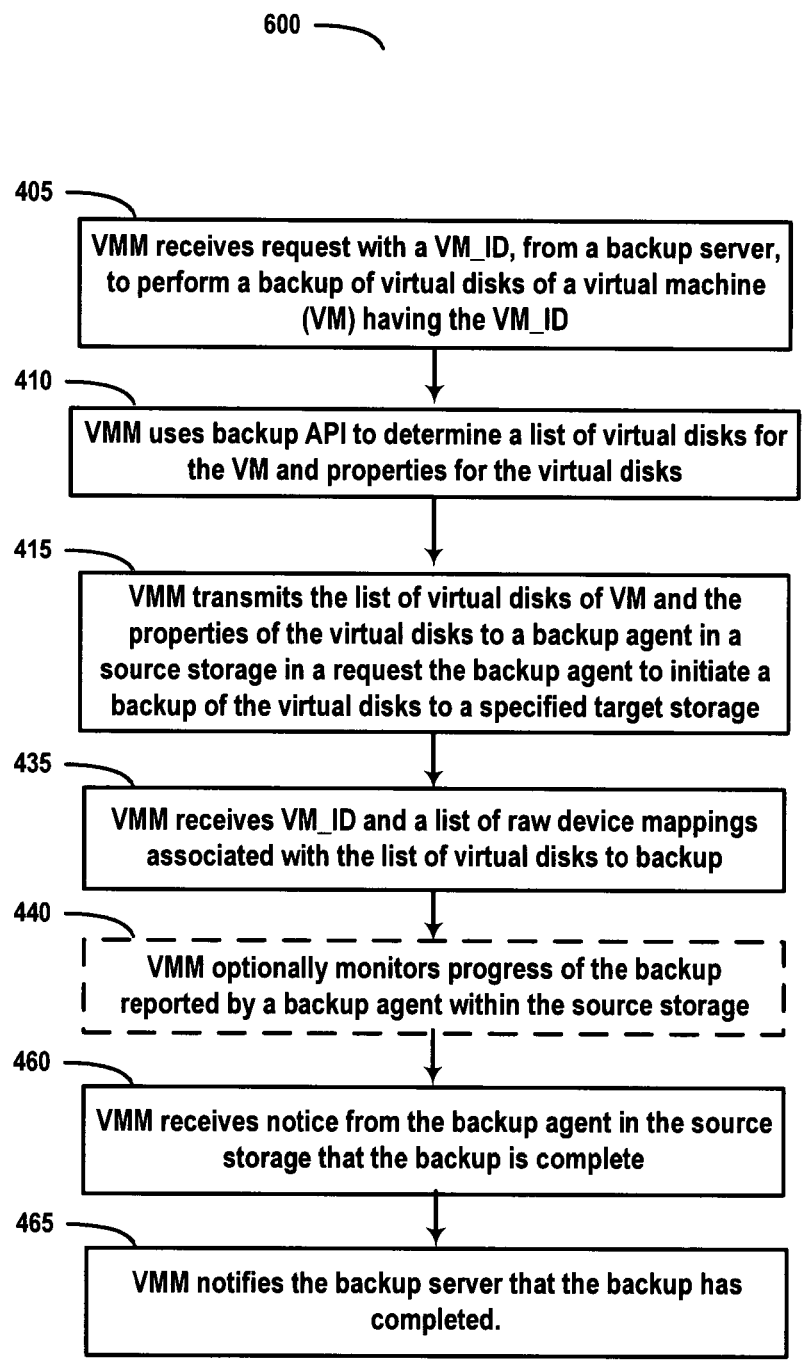
FIG. 6 illustrates a flow chart of a method of a virtual machine manager backing up one or more virtual disks of a virtual machine according to some embodiments.

FIG. 6 illustrates a method 600 of backing up one or more disks of a VM 250, from the perspective of the VMM 220 in host 200 according to some embodiments.

In operation 405, VMM 250 can receive a request from backup server 300 that host 200 perform a backup of one or more virtual disks of a VM 250. In an embodiment, the request can include a globally unique identifier (VM_ID) of the VM 250 whose virtual disks are to be backed up. The request can further specify details as to the scope of the data to be backed up (e.g. which application data should be backed up), the nature of the backup (incremental v. full v. image backup), and the target storage 290 to receive the data to be backed up. In an embodiment, the VM_ID for the VM 250 can be based, at least in part, on an identifier of the virtual BIOS 231 of the VM 250 whose data is being backed up.

In operation 410, in response to host 200 receiving the request 405 from backup server 300, host 200 can cause VMM 220 to use backup API 225 to read configuration file 245 to determine the virtual disk(s) 232 associated with VM 250 having identifier VM_ID to be backed up. Configuration file 245 may further contain information such as filenames, files types, creation dates, file sizes and other information related to data stored on the virtual disk(s) 232 associated with VM 250 that may be useful in performing the backup.

In operation 415, VMM 220 can request that backup agent 275 on source storage 280 perform a backup of one or more virtual disks 232 associated with VM 250 having VM_ID. The request to backup agent 275 can include the VM_ID of the VM 250 and a list of one or more virtual disks 232 associated with VM 250. The request to backup agent 275 can also include the target storage 290 to receive the backup data from source storage 280. The request can also include an address and/or name of the backup server 300 from which the backup request originated.

In operation 435, VMM 220 can receive from the backup agent 275 on source storage 280, the VM_ID, name of the virtual disk(s) (as known to the VM 250), the filename of the mapping file 285 for each virtual disk mapped to a raw disk, the mapping type (physical or virtual), and an address of the source storage 280 and target storage 290 for the backup that is about to be performed by the backup agent 275. This information can be received by the VMM 220 that requested the backup, the backup server 300 that originally requested the backup, or both. In an embodiment, the same information can be transmitted to target storage 290 as a manifest of the data to be backed up. The manifest can further include such metadata as the file size of each virtual disk or file so that the target storage 290 can determine whether there is space to receive the data to be backed up.

In operation 440, one or both of VMM 220 or backup server 300 can optionally monitor the progress of the backup that is about to begin. Monitoring can include polling the backup agent 275 to determine backup progress or subscribing to messages from backup agent 275 regarding the backup. In an embodiment, backup server 300 can monitor target storage 290 as to progress of the backup, while VMM 250 monitors source storage 280 progress of the backup.

In operation 460, source storage 280 can notify VMM 220 that the backup is complete.

In operation 465, VMM 220 can notify backup server 300 that the backup is complete.

Figure 7:
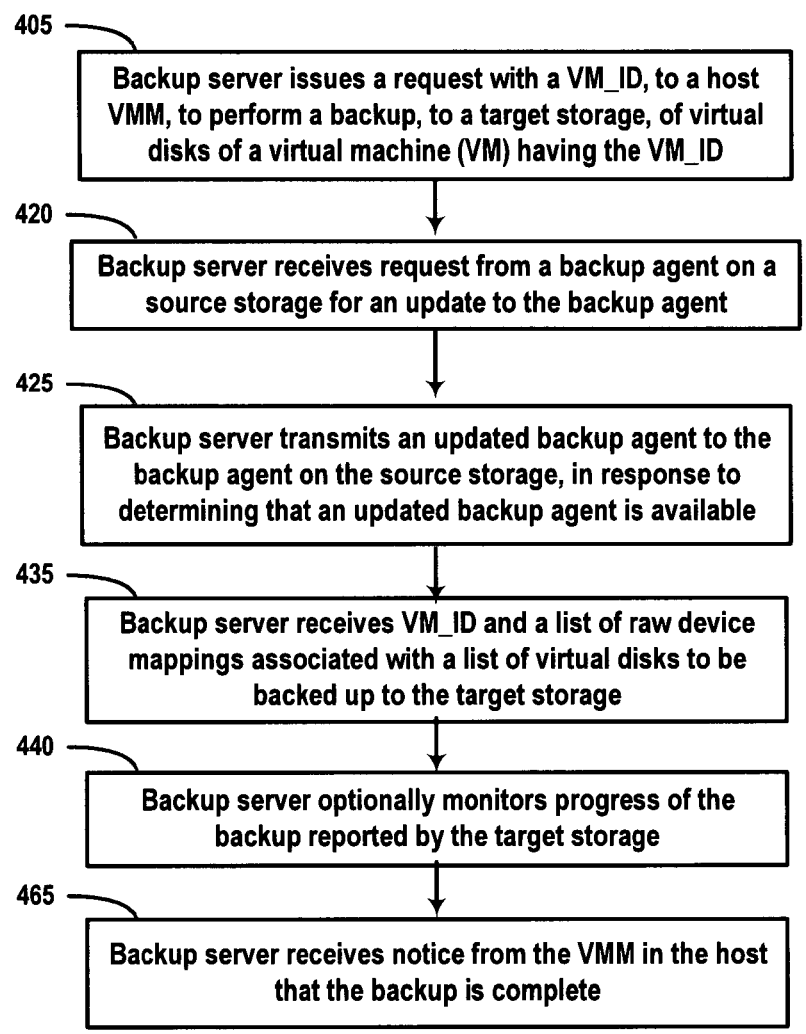
FIG. 7 illustrates a flow chart of a method of a backup server backing up one or more virtual disks of a virtual machine according to some embodiments.

FIG. 7 illustrates a method of backing up one or more disks of a VM 250, from the perspective of the backup server 300.

In operation 405, backup server 300 can request that host 200 perform a backup of one or more virtual disks of a VM 250. In an embodiment, the request can include a globally unique identifier (VM_ID) of the VM 250 whose virtual disks are to be backed up. The request can further specify details as to the scope of the data to be backed up (e.g. which application data should be backed up), the nature of the backup (incremental v. full v. image backup), and the target storage 290 to receive the data to be backed up. In an embodiment, the VM_ID for the VM 250 can be based, at least in part, on an identifier of the virtual BIOS 231 of the VM 250 whose data is being backed up.

In operation 420, backup server 300 can receive a request from backup agent 275 on source storage 280 for an updated backup agent 275 from storage server 300. The update request can include an address and/or name of the source storage 280 making the request, version information about the backup agent 275 currently installed on source storage 280, and optionally information about VM 250, such as the VM_ID, guest OS 240 of the VM 250, file types to be backed up, application(s) that generated the data to be backed up, etc.

In operation 425, backup server 300 can check its database of agents 340 to determine whether a newer version exists for the backup agent 275 on source storage 280. If so, then backup server 300 can send the updated backup agent to the existing backup agent 275 on source storage 280 to update itself. If no new update exists for the backup agent 275, then backup server 300 can return a message stating that no new version of backup agent 275 is available.

In operation 435, backup server 300 can receive from backup agent 275 information backup the backup including the VM_ID of the VM 250 whose data is being backed up, the name of the virtual disk(s) (as known to the VM 250), the filename of the mapping file 285 for each virtual disk mapped to a raw disk, the mapping type (physical or virtual), and an address of the source storage 280 and target storage 290 for the backup that is about to be performed by the backup agent 275. In an embodiment, the backup server can transmit the information to target storage 290 as a manifest of the data to be backed up. The manifest can further include such metadata as the file size of each virtual disk or file so that the target storage 290 can determine whether there is space to receive the data to be backed up.

In operation 440, one or both of VMM 220 or backup server 300 can optionally monitor the progress of the backup that is about to begin. Monitoring can include polling the backup agent 275 to determine backup progress or subscribing to messages from backup agent 275 regarding the backup. In an embodiment, backup server 300 can monitor target storage 290 as to progress of the backup, while VMM 250 monitors source storage 280 progress of the backup.

In operation 465, backup server 300 can receive a notification from VMM 220 that the backup is complete.

FIGS. 8-11 describe a communications flow and methods for restoring one or more data sets to a VM 250. The following processes assume that the VM 250, itself, has been reinstalled or otherwise recovered, and that the VM 250 file system, virtual disk(s), files, data sets, or combination of these, are to be restored. To be consistent with the virtual infrastructure elements shown in FIGS. 1-3, the storage that contains the data to be restored is the target storage 290 and the storage that will receive the data to be restored is the source storage 280.

Figure 8:
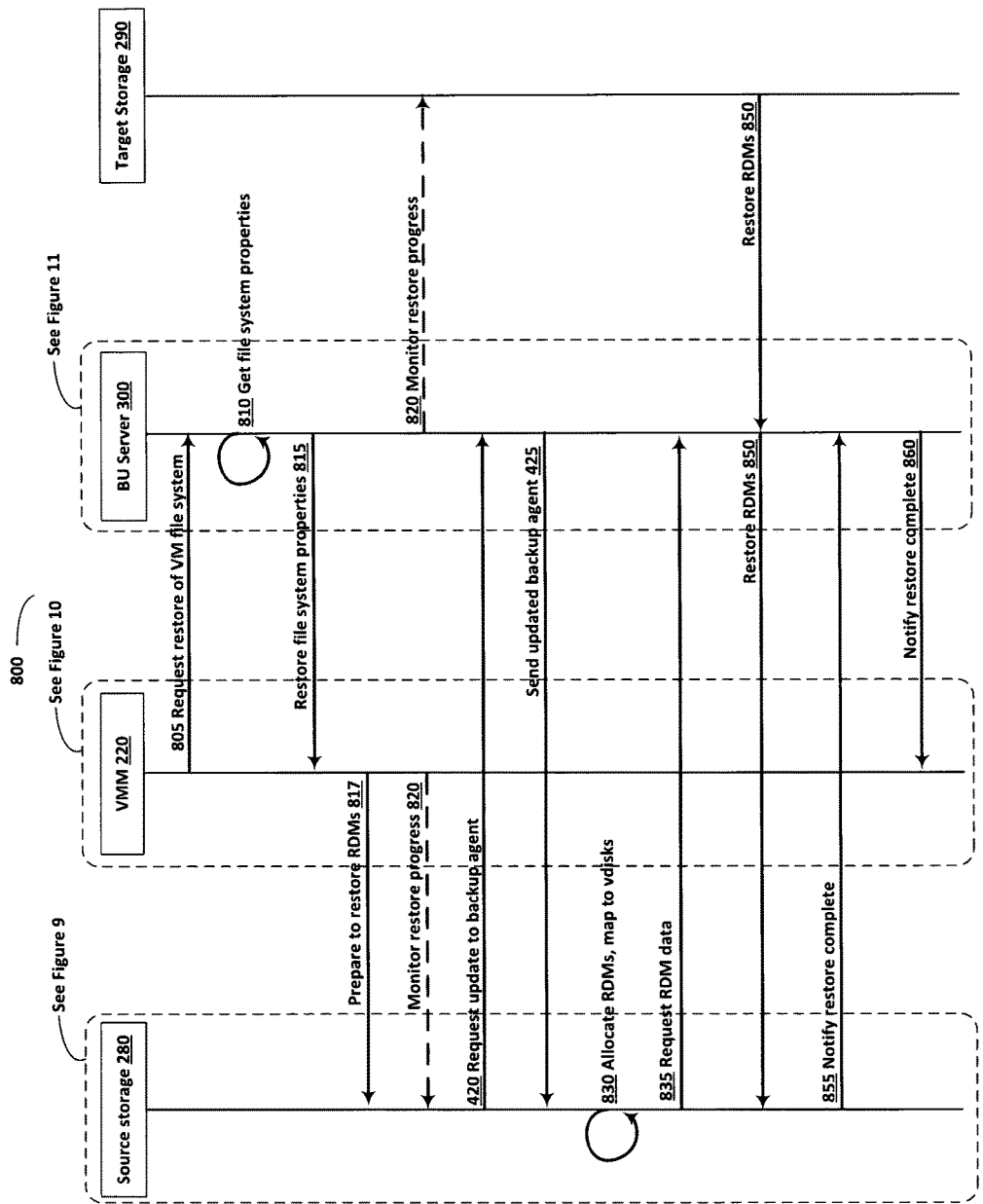
FIG. 8 illustrates an example communication flow for restoring up one or more virtual disks of a virtual machine according to some embodiments.

FIG. 8 illustrates a communication flow 800 for restoring a file system, virtual disk(s), data sets, or combination of these ("restore operation") to a VM 250.

In operation 805, a VMM 220 of a VM 250 can request that a backup server 300 initiate a restore operation on behalf of the VM 250. The request can include a unique virtual machine VM 250 identifier (VM_ID), a host 200 identifier, a source storage 280 name or address where the data is to be restored, and optionally a target storage 290 where the data is currently stored. In an embodiment, the request 805 can originate from remote administration 110.

In operation 810, backup server 300 can obtain the file system properties of the VM 250, such as virtual disk(s), filenames, file sizes, file types, and other meta data describing the VM 250 file system. In an embodiment, the backup server 300 can obtain this information from backup catalog 350. In an embodiment, the information can be obtained by the backup server 300 querying the target storage 290 having the data to be restored.

In operation 815, backup server 300 can restore the file system properties to the VM 250 via VMM 220 and one or more calls to backup API 225. Restoring file system properties can include restoring configuration file 245 to a same state as the state of the virtual disk(s), files, and other file system data to be restored. Configuration file information can include a file name for each virtual disk to be restored, and a corresponding file name on a source storage. The corresponding filename may indicate a raw device mapping file 285 on source storage 280. Files may have attributes such as type, file size, creation date, modification date, and access attributes. Some or all of these attributes may be restored to the VM 250 from backup catalog data 350 by backup server 300.

In operation 817, VM 220 can use backup API 225 to request that source storage 280 (via backup agent 275) prepare to restore one or more raw disks corresponding to one or more virtual disks 232. The request can include meta data describing the virtual disk(s) and raw disk(s), such as the raw disk name, size, a list of portions of storage (e.g. logical unit numbers, "LUNs") that make up a virtual disk, file type, etc.

In operation 820 VM 220, and/or backup server 300, can optionally notify source storage 280 and target storage 290, respectively, that VM 220 and/or backup server 300 will monitor restore progress at the source storage 280 and target storage 290, respectively.

In operation 420, backup agent 275 in source storage 280 can optionally request an updated backup agent (an update to itself) from backup server 300. The request can include an address of the source storage 280, current version information of the backup agent, details about source storage 280 make, model, or computational capabilities that may be relevant to determining whether an updated backup agent 275 is available.

In operation 425, backup server 300 can access a database of agents 340, select an updated backup agent and transmit the updated backup agent to source storage 280.

In operation 830, after updating backup agent 275 (if needed), then backup agent 275 can cause source storage 280 to allocate portions of storage (e.g. LUNs) for virtual disks to be restored.

In operation 835, backup agent 275 within source storage 280 can request virtual disk restore data from backup server 300.

In operation 850, restore data can be transmitted, either by the backup server 300, or from the target storage 290 and facilitated by the backup server 300, to the source storage 280. Backup agent 275 on source storage 280 can facilitate receipt of the restore data.

In operation 855, backup agent 275 can notify backup server 300 that the restore has completed.

In operation 860, backup server 300 can notify VMM 220 that the restore has completed.

Figure 9:
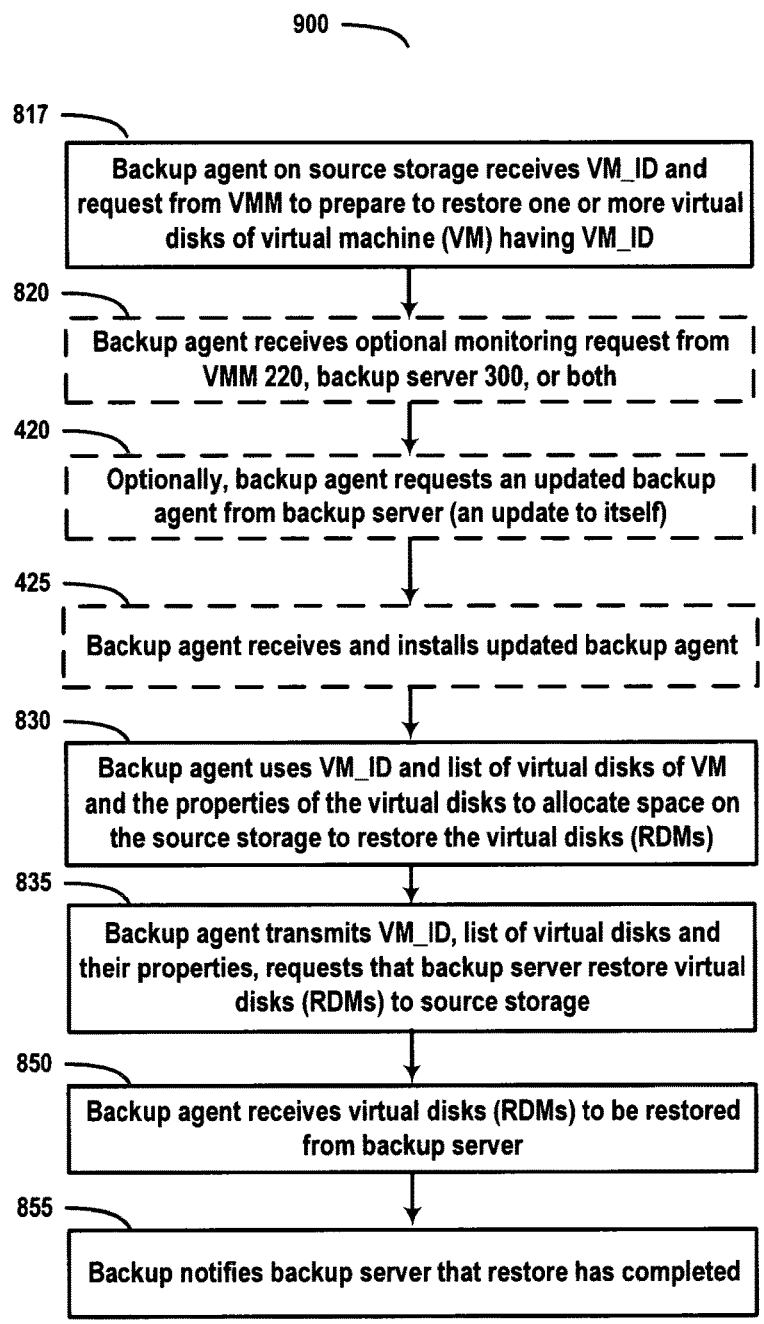
FIG. 9 illustrates a flow chart of a method of a source storage backup agent restoring one or more virtual disks of a virtual machine according to some embodiments.

FIG. 9 illustrates a flow chart of a method 900 of a source storage backup agent 275 restoring one or more virtual disks of a virtual machine 250 according to some embodiments.

In operation 817, source storage backup agent 275 can receive a request from VM 220 that source storage 280 (via backup agent 275) prepare to restore one or more raw disks corresponding to one or more virtual disks 232. The request can include meta data describing the virtual disk(s) and raw disk(s), such as the raw disk name, size, a list of portions of storage (e.g. logical unit numbers, "LUNs") that make up a virtual disk, file type, etc.

In operation 820, source storage backup agent 275 can optionally receive a notification from VM 220, and/or backup server 300, that VM 220 will monitor restore progress at the source storage 280.

In operation 420, backup agent 275 in source storage 280 can optionally request an updated backup agent (an update to itself) from backup server 300. The request can include an address of the source storage 280, current version information of the backup agent, details about source storage 280 make, model, or computational capabilities that may be relevant to determining whether an updated backup agent 275 is available.

In operation 425, backup agent 275 can receive an updated backup agent 275 from backup server 300. Backup agent 275 can receive the updated backup agent 275 and update itself prior to proceeding with the restore data process.

In operation 830, after updating backup agent 275 (if needed), then backup agent 275 can cause source storage 280 to allocate portions of storage (e.g. LUNs) for virtual disks to be restored.

In operation 835, backup agent 275 within source storage 280 can request virtual disk restore data from backup server 300.

In operation 850, the source storage 280 can receive restore data, either from the backup server 300, or from the target storage 290 and facilitated by the backup server 300. Backup agent 275 on source storage 280 can facilitate receipt of the restore data.

In operation 855, backup agent 275 can notify backup server 300 that the restore has completed.

Figure 10:
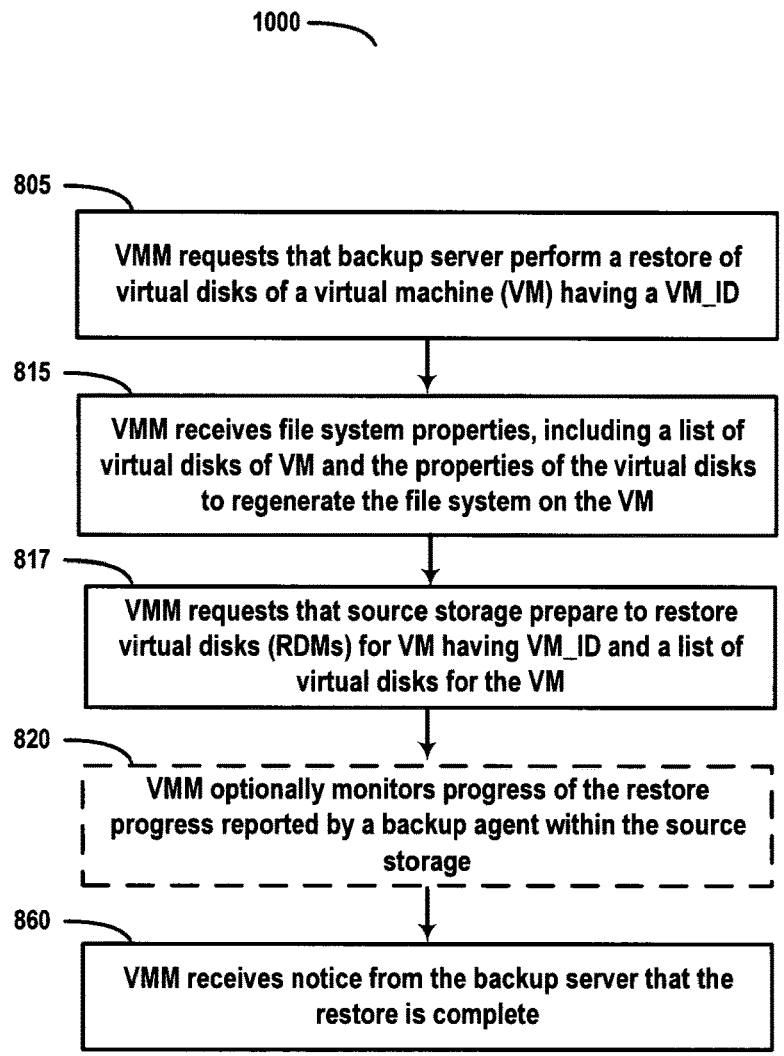
FIG. 10 illustrates a flow chart of a method of a virtual machine manager restoring one or more virtual disks of a virtual machine according to some embodiments.

FIG. 10 illustrates a flow chart of a method 1000 of a virtual machine manager (VMM) 220 restoring one or more virtual disks 232 of a virtual machine (VM) 250 according to some embodiments.

In operation 805, a VMM 220 of a VM 250 can request that a backup server 300 initiate a restore operation on behalf of the VM 250. The request can include a unique virtual machine VM 250 identifier (VM_ID), a host 200 identifier, a source storage 280 name or address where the data is to be restored, and optionally a target storage 290 where the data is currently stored. In an embodiment, the restore request can be generated by remote administration 110.

In operation 815, VM 250 can receive and restore file system properties from backup server 300 via VMM 220 and one or more calls to backup API 225. Restoring file system properties can include restoring configuration file 245 to a same state as the state of the virtual disk(s), files, and other file system data to be restored. Configuration file information can include a file name for each virtual disk to be restored, and a corresponding file name on a source storage. The corresponding filename may indicate a raw device mapping file 285 on source storage 280. Files may have attributes such as type, file size, creation date, modification date, and access attributes. Some or all of these attributes may be restored to the VM 250 from backup catalog data 350 by backup server 300.

In operation 817, VM 220 can use backup API 225 to request that source storage 280 (via backup agent 275) prepare to restore one or more raw disks corresponding to one or more virtual disks 232. The request can include meta data describing the virtual disk(s) and raw disk(s), such as the raw disk name, size, a list of portions of storage (e.g. logical unit numbers, "LUNs") that make up a virtual disk, file type, etc.

In operation 820, VM 220 can optionally notify source storage 280 that VM 220 will monitor restore progress at the source storage 280.

In operation 860, VM 220 can receive a notification from backup server 300 that the restore has completed.

Figure 11:
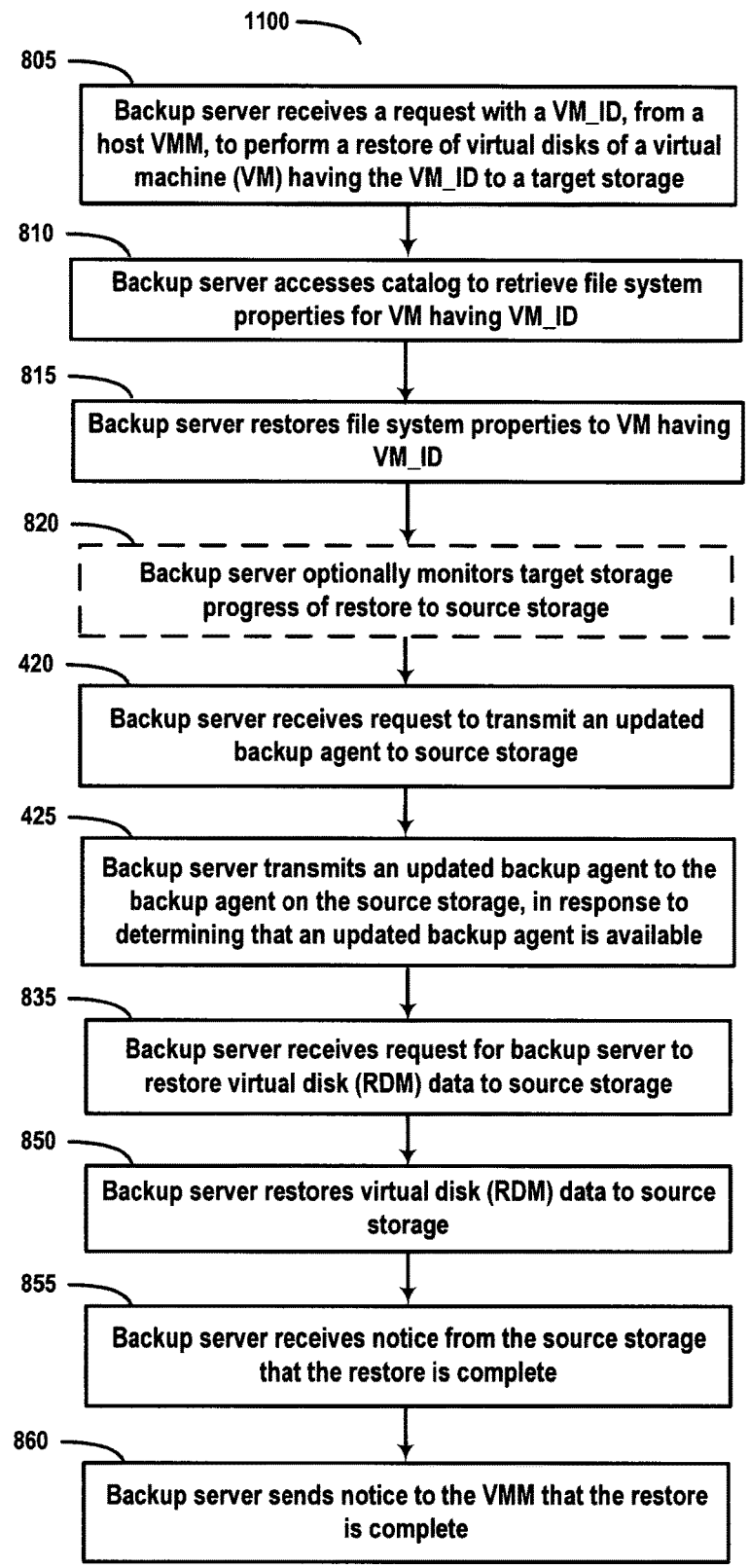
FIG. 11 illustrates a flow chart of a method of a backup server restoring one or more virtual disks of a virtual machine according to some embodiments.

FIG. 11 illustrates a flow chart of a method 1100 of a backup server 300 restoring one or more virtual disks 232 of a virtual machine (VM) 250 according to some embodiments.

In operation 805, a backup server 300 can receive a request from a VMM 220 to initiate a restore operation on behalf of the VM 250. The request can include a unique virtual machine VM 250 identifier (VM_ID), a host 200 identifier, a source storage 280 name or address where the data is to be restored, and optionally a target storage 290 where the data is currently stored. In an embodiment, the request can be generated by remote administration 110.

In operation 810, backup server 300 can obtain the file system properties of the VM 250, such as virtual disk(s), filenames, file sizes, file types, and other meta data describing the VM 250 file system. In an embodiment, the backup server 300 can obtain this information from backup catalog 350. In an embodiment, the information can be obtained by the backup server 300 querying the target storage 290 that having the data to be restored.

In operation 815, backup server 300 can restore the file system properties to the VM 250 via VMM 220 and one or more calls to backup API 225. Restoring file system properties can include restoring configuration file 245 to a same state as the state of the virtual disk(s), files, and other file system data to be restored. Configuration file information can include a file name for each virtual disk to be restored, and a corresponding file name on a source storage. The corresponding filename may indicate a raw device mapping file 285 on source storage 280. Files may have attributes such as type, file size, creation date, modification date, and access attributes. Some or all of these attributes may be restored to the VM 250 from backup catalog data 350 by backup server 300.

In operation 820, backup server 300 can optionally notify target storage 290 backup server 300 will monitor restore progress at the target storage 290.

In operation 420, backup server 300 can receive a request from backup agent 275 in source storage 280 for an updated backup agent 275 (an update to itself) from backup server 300. The request can include an address of the source storage 280, current version information of the backup agent, details about source storage 280 make, model, or computational capabilities that may be relevant to determining whether an updated backup agent 275 is available.

In operation 425, backup server 300 can access a database of agents 340, select an updated backup agent and transmit the updated backup agent to source storage 280.

In operation 835, backup server 300 can receive a request for virtual disk restore data from backup agent 275 within source storage 280.

In operation 850, restore data can be transmitted, either by the backup server 300, or from the target storage 290 and facilitated by the backup server 300, to the source storage 280. Backup agent 275 on source storage 280 can facilitate receipt of the restore data.

In operation 855, backup server 300 can receive a notification that the restore of VM 250's virtual disk(s) is complete from backup agent 275.

In operation 860, backup server 300 can notify VMM 220 that the restore has completed.

Figure 12:
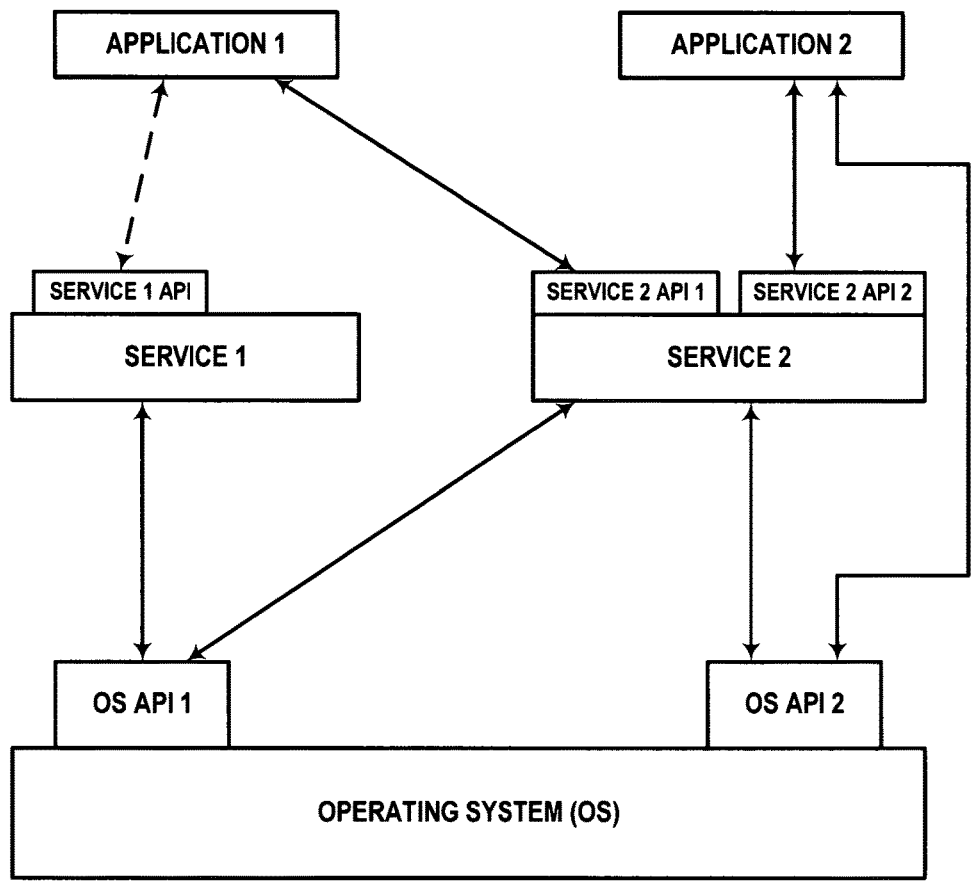
FIG. 12 illustrates an exemplary embodiment of a software stack usable in some embodiments of the invention.

In FIG. 12 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 13:
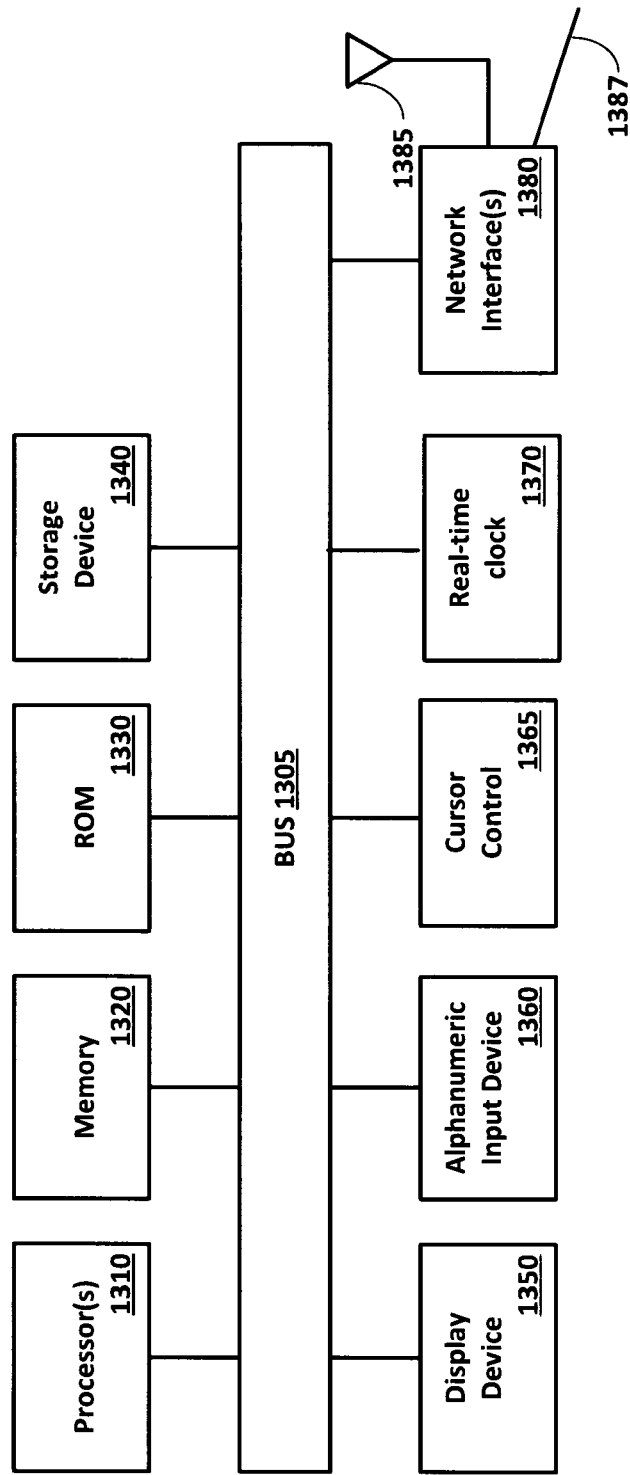
FIG. 13 illustrates, in block diagram form, an exemplary computing system for implementing concepts described herein.

FIG. 13 is a block diagram of one embodiment of a computing system 1300. The computing system illustrated in FIG. 13 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 13 may be used to provide a computing device and/or a server device.

Computing system 1300 includes bus 1305 or other communication device to communicate information, and processor 1310 coupled to bus 1305 that may process information.

While computing system 1300 is illustrated with a single processor, computing system 1300 may include multiple processors and/or co-processors 1310. Computing system 1300 further may include random access memory (RAM) or other dynamic storage device 1320 (referred to as main memory), coupled to bus 1305 and may store information and instructions that may be executed by processor(s) 1310.

Main memory 1320 may also be used to store temporary variables or other intermediate information during execution of instructions by processor 1310.

Computing system 1300 may also include read only memory (ROM) 1330 and/or other static, non-transitory storage device 1340 coupled to bus 1305 that may store static information and instructions for processor(s) 1310. Data storage device 1340 may be coupled to bus 1305 to store information and instructions. Data storage device 1340 such as flash memory or a magnetic disk or optical disc and corresponding drive may be coupled to computing system 1300.

Computing system 1300 may also be coupled via bus 1305 to display device 1350, such as a cathode ray tube (CRT), light-emitting diode display (LED), or liquid crystal display (LCD), to display information to a user. Computing system 1300 can also include an alphanumeric input device 1360, including alphanumeric and other keys, which may be coupled to bus 1305 to communicate information and command selections to processor(s) 1310. Another type of user input device is cursor control 1365, such as a touchpad, a mouse, a trackball, or cursor direction keys to communicate direction information and command selections to processor(s) 1310 and to control cursor movement on display 1350. Computing system 1300 may further include a real-time clock 1370. The real-time clock 1370 may be used for generating date/time stamps for data records, computing elapsed time, and other time-keeping functions. A real-time clock 1370 can be a battery-backed chipset with a settable date and time. Alternatively, a real-time clock 1370 may include logic to retrieve a real-time from a network source such as a server or an Internet server via network interfaces 1380, described below.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1300 can include multiple wireless network interfaces such as a combination of WiFi, Bluetooth® and cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
receiving, by a virtual machine manager on a first computing device, a request for backup of a virtual disk of a virtual machine on the first computing device to a target storage device, the request originating from a second computing device, wherein the virtual machine is identified by a unique virtual machine identifier within the request, and wherein the virtual machine manager includes a backup application programming interface (API);
in response to receiving the request, determining, by the virtual machine manager using the backup API therein, an identifier for the virtual disk of the virtual machine to be backed up to the target storage device;
determining, by the virtual machine manager, a mapping of the identifier for the virtual disk to one or more portions of disk storage on a source storage device, wherein the virtual machine manager uses the backup API therein to communicate with a backup agent on the source storage device to determine the mapping of the identifier for the virtual disk to the one or more portions of disk storage on the source storage device, wherein determining the mapping of the identifier for the virtual disk to the one or more portions of disk storage includes requesting, by the virtual machine manager, a mapping of a raw virtual disk in the virtual disk to the one or more portions of disk storage from the source storage device, wherein the mapping of the raw virtual disk to the one or more portions of storage is defined by a raw disk mapping file, wherein the raw disk mapping is requested by the virtual machine manager from the source storage device;
triggering, by the virtual machine manager, transmission to the target storage device, the identifier for the virtual disk, the mapping of the identifier for the virtual disk to the one or more portions of disk storage, and data stored in the one or more portions of disk storage on the source storage device.

2. The method of claim 1, wherein each of the one or more portions of disk storage comprises one or more logical units of storage (LUNs).

3. The method of claim 1, wherein the virtual machine manager calls the backup API to obtain a list of virtual disks configured for the virtual machine.

4. The method of claim 1, wherein the raw virtual disk is configured in virtual mapping mode.

5. The method of claim 1, wherein triggering the transmission to the target storage device comprises the virtual machine manager communicating with the backup agent the source storage device to cause the source storage device to begin transmission of the data stored in the one or more portions of disk storage.

6. A non-transitory computer readable medium, programmed with executable instructions that, when executed by a processing system, perform operations comprising:
receiving, by a virtual machine manager on a first computing device, a request for backup of a virtual disk of a virtual machine on the first computing device to a target storage device, the request originating from a second computing device, wherein the virtual machine is identified by a unique machine identifier within the request, and wherein the virtual machine manager includes a backup application programming interface (API);

in response to receiving the request, determining, by the virtual machine manager using the backup API therein, an identifier for the virtual disk of the virtual machine to be backed up to the target storage device;

determining, by the virtual machine manager, a mapping of the identifier for the virtual disk to one or more portions of disk storage on a source storage device, wherein the virtual machine manager uses the backup API therein to communicate with a backup agent on the source storage device to determine the mapping of the identifier for the virtual disk to the one or more portions of disk storage on the source storage device, wherein determining the mapping of the identifier for the virtual disk to the one or more portions of disk storage includes requesting, by the virtual machine manager, a mapping of a raw virtual disk in the virtual disk to the one or more portions of disk storage from the source storage device, wherein the mapping of the raw virtual disk to the one or more portions of storage is defined by a raw disk mapping file, wherein the raw disk mapping is requested by the virtual machine manager from the source storage device;

triggering, by the virtual machine manager, transmission to the target storage device, the identifier for the virtual disk, the mapping of the identifier for the virtual disk to the one or more portions of disk storage, and data stored in the one or more portions of disk storage on the source storage device.

7. The medium of claim 6, wherein each of the one or more portions of disk storage comprises one or more logical units of storage (LUNs).

8. The medium of claim 6, wherein the virtual machine manager calls the backup API to obtain a list of virtual disks configured for the virtual machine.

9. The medium of claim 6, wherein the raw virtual disk is configured in virtual mapping mode.

10. The medium of claim 6, wherein triggering the transmission to the target storage device comprises the virtual machine manager communicating with the backup agent on the source storage device to cause the source storage device to begin transmission of the data stored in the one or more portions of disk storage.

11. A processing system, comprising a hardware processor coupled to a memory programmed with executable instructions, that when executed by the processing system, perform operations comprising:

receiving, by a virtual machine manager on a first computing device, a request for backup of a virtual disk of a virtual machine on the first computing device to a target storage device, the request originating from a second computing device, wherein the virtual machine is identified by a unique virtual machine identifier within the request, and wherein the virtual machine manager includes a backup application programming interface (API);

in response to receiving the request, determining, by the virtual machine manager using the backup API therein, an identifier for the virtual disk of the virtual machine to be backed up to the target storage device;

determining, by the virtual machine manager, a mapping of the identifier for the virtual disk to one or more portions of disk storage on a source storage device, wherein the virtual machine manager uses the backup API therein to communicate with a backup agent on the source storage device to determine the mapping of the identifier for the virtual disk to the one or more portions of disk storage on the source storage device, wherein determining the mapping of the identifier for the virtual disk to the one or more portions of disk storage includes requesting, by the virtual machine manager, a mapping of a raw virtual disk in the virtual disk to the one or more portions of disk storage from the source storage device, wherein the mapping of the raw virtual disk to the one or more portions of storage is defined by a raw disk mapping file, wherein the raw disk mapping is requested by the virtual machine manager from the source storage device;

triggering, by the virtual machine manager, transmission to the target storage device, the identifier for the virtual disk, the mapping of the identifier for the virtual disk to the one or more portions of disk storage, and data stored in the one or more portions of disk storage on the source storage device.

12. The system of claim 11, wherein each of the one or more portions of disk storage comprises one or more logical units of storage (LUNs).

13. The system of claim 11, wherein the virtual machine manager calls the backup API to obtain a list of virtual disks configured for the virtual machine.

14. The system of claim 11, wherein the raw virtual disk is configured in virtual mapping mode.

15. The system of claim 11, wherein triggering the transmission to the target storage device comprises the virtual machine manager communicating with the backup agent on the source storage device to cause the source storage device to begin transmission of the data stored in the one or more portions of disk storage.

* * * * *